Sept. 2, 1958     H. N. CHAIT ET AL     2,850,705
RIDGED FERRITE WAVEGUIDE DEVICE
Filed April 18, 1955     2 Sheets-Sheet 1
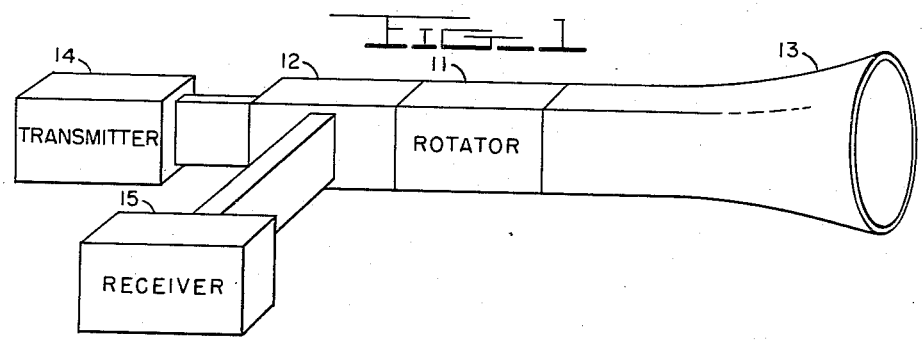
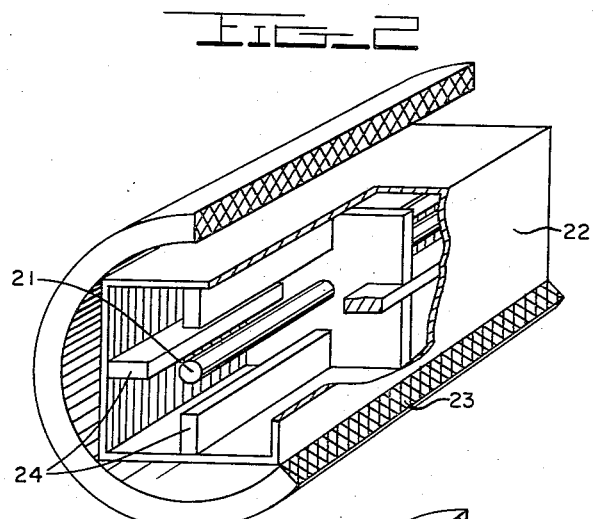
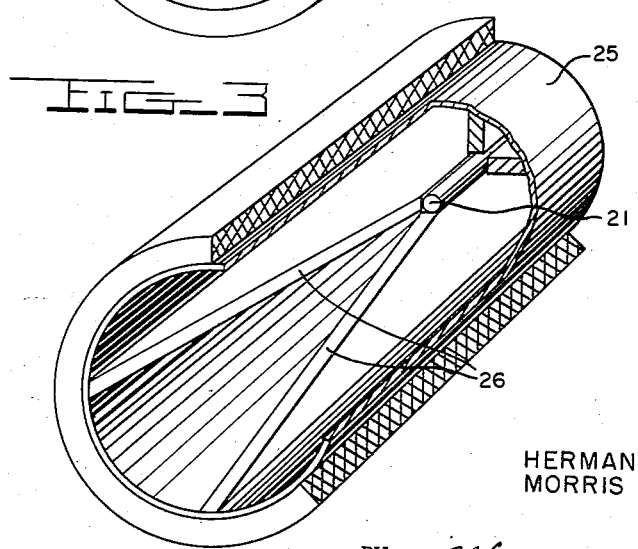
INVENTORS
HERMAN N. CHAIT
MORRIS L. KALES
BY *W. R. Maltby*
*Howard White* ATTORNEYS Sept. 2, 1958     H. N. CHAIT ET AL     2,850,705
RIDGED FERRITE WAVEGUIDE DEVICE
Filed April 18, 1955     2 Sheets-Sheet 2
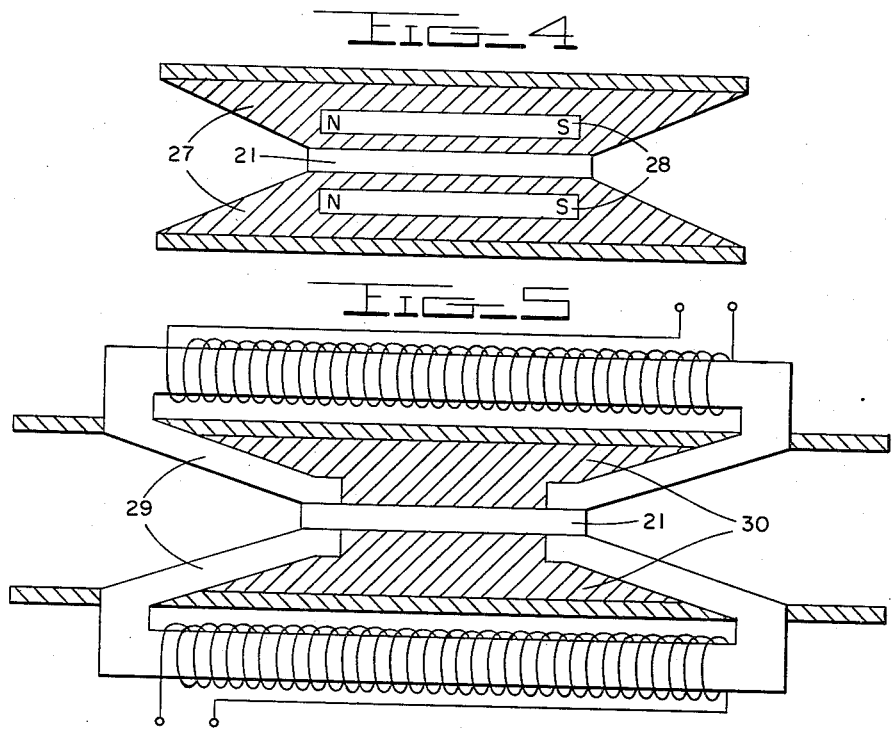
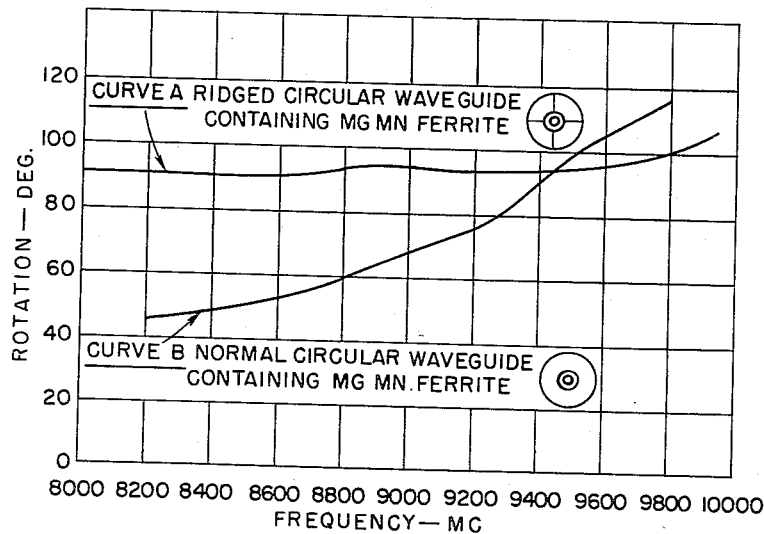
INVENTORS
HERMAN N. CHAIT
MORRIS L. KALES
BY *W. R. Maltby*
*Howard White* ATTORNEYS United States Patent Office 2,850,705
Patented Sept. 2, 1958

1

2,850,705

RIDGED FERRITE WAVEGUIDE DEVICE

Herman N. Chait and Morris L. Kales, Washington, D. C., assignors to the United States of America as represented by the Secretary of the Navy Application April 18, 1955, Serial No. 502,257

8 Claims. (Cl. 333—98)

(Granted under Title 35, U. S. Code (1952), sec. 266)

The invention described herein may be manufactured and used by or for the Government of the United States of America for governmental purposes without the payment of any royalties thereon or therefor.

The present invention relates in general to ferrite type waveguide coupling devices having a non-reciprocal plane-of-polarization rotation characteristic and in particular to an improved waveguide structure for providing a constant rotation over a relatively wide band of frequencies.

As is well known, ferrite type coupling devices are finding more and more utility in the waveguide field. For example, this type of coupling device is now quite frequently employed in a duplexer arrangement to permit the use of a single antenna in a radar system. For a full appreciation of the duplexer utility of ferrite type coupling means, reference is had to the copending application Ser. No. 365,299, filed June 30, 1953, of Morris L. Kales for Antenna Coupling System.

Although ferrite type coupling means are quite useful in that they possess the highly desirable phenomenal advantage of a non-reciprocal rotation of the plane-of-polarization, that is the rotation is independent of the direction of propagation of the wave through the coupling means, it is generally recognized that such devices are limited in their application due to the fact that they are extremely frequency sensitive. Precisely, the amount of rotation varies in accordance with the frequency of the propagated wave. It may be correctly stated that ferrite type coupling means have heretofore been considered as narrow band devices primarily suitable for use in single frequency applications.

Accordingly, it is an object of this invention to provide a ferrite type waveguide section which permits a constant rotation of the plane-of-polarization of a propagated wave over a relatively wide band of frequencies.

It is another object of this invention to provide a ferrite type waveguide section suitable for use in a wider variety of frequency applications.

It is still another object of this invention to provide an improved ferrite type waveguide coupling means in which the magnetizing means is entirely contained within the waveguide structure.

It is a further object of this invention to provide an improved means for supporting the ferrite in a ferrite rotator.

It is an additional object of this invention to provide a new and unique multi-ridge waveguide structure.

Other objects of this invention will become apparent upon a more complete understanding of the invention for which reference is had to the accompanying specification and drawings wherein:

Fig. 1 is a block diagram showing of an operating system in which the present invention is advantageously incorporated;

Fig. 2 is a pictorial cross-sectional view of one embodiment of the invention;

2

Fig. 3 is a pictorial cross-sectional view of a second embodiment of the invention;

Fig. 4 is a cross-sectional view of the invention in another embodiment thereof;

Fig. 5 is a cross-sectional view of the invention in still another embodiment thereof; and Fig. 6 is a graph depicting the improved result obtained by use of the present invention.

Briefly, this invention provides a new and novel waveguide structure, namely, a multi-ridged waveguide section containing a ferrite core, for producing a non-reciprocal rotation of the plane-of-polarization of a propagated wave. In contrast with the frequency sensitive narrow band non-reciprocal rotators heretofore known, the device of this invention is characterized by a relatively constant rotation irrespective of the frequency of the wave being propagated therethrough and has the added advantages of compactness and simplicity of construction.

Referring now to the drawings in more detail:

Fig. 1, in an exemplary showing of the invention in an operating system, presents a now generally familiar duplexer arrangement of the type described in the aforementioned copending application. It will be appreciated by those familiar in the art that it is basic to this particular application that the ferrite rotator 11 be interposed the two-mode transducer 12 and the antenna 13 as shown in the drawings.

In analysis of this duplexer arrangement, the two-mode transducer 12 essentially comprises a section of waveguide which is capable of supporting two orthogonal modes of propagation, for example a square waveguide, and two sections of rectangular waveguide, each capable of supporting only one mode of propagation. The rectangular waveguide sections are especially connected to the transducer 12, the first to one end to couple to one supportable mode and the other on a side to couple to its orthogonal mode. To facilitate the desired single antenna operation the first of said waveguide sections is connected to the transmitter 14 and the other is connected to the receiver 15 in the same manner shown.

In operation, the transmitter 14 directs wave energy of a determined plane-of-polarization, for example horizontal, through the transducer 12 and the ferrite waveguide structure 11 to the antenna 13. Since during the operation of the transmitter 14, none of the first incident wave energy from the transmitter will be directed through the above described orthogonally polarized rectangular waveguide, the orthogonally, or vertically, polarized waveguide section is of no consideration in the first progression of the wave through the transducer 12.

In accordance with the basic concept of this invention, the plane-of-polarization of the principal mode of the wave energy from the transmitter 14 is rotated in passing through the ferrite waveguide section 11 to the antenna 13. Since the wave theory of the rotation of the plane-of-polarization in a waveguide is extremely complicated, no detailed mathematical explanation will be attempted herein. In basic simplification, however, the rotation effect in ferrite waveguide may be explained by considering the linear polarization of the input wave as being the resultant of two circular components, one right handed and the other left, which vectorially combine to determine the magnitude and direction of the linear polarization It has been found that ferrite material becomes anisotropic upon the application of a magnetic field in such a manner as to have different indices of refraction for right and left hand polarizations. Consequently, in passing an input wave constituting two oppositely directed circular components through a waveguide containing a magnetized ferrite material, it will be seen that a relative phase shift is introduced between the two circularly polarized components. In the vectorial recombination of the two circular components at the output, the magnitude of these components essentially determines the magnitude of the resultant and the phase difference therebetween determines the relative direction or rotation of the resultant linear polarization.

As more fully explained in the article "The Microwave Cyrator," by C. L. Hogan, Bell System Technical Journal, vol. 31, and the U. S. Patent No. 2,644,930 to C. H. Luhrs et al., for a particular frequency, the amount of phase shift which determines the degree of rotation is effected by the permeability of the core, as determined by its composition and the magnetic field imposed thereon, and by the dimensions of the core. The sense of the phase shift which determines the direction of rotation is effected by the sense of the polarization of the wave being propagated and the direction of the magnetic field relative to the direction of propagation of the wave through the waveguide. For the particular duplexer application shown, the ferrite waveguide section is so proportioned to provide a 45° rotation of the plane-of-polarization of the propagated wave. It has been found, as explained in the above-mentioned Hogan article and Luhrs patent, that the direction of rotation as considered from one end will be the same, clockwise or counter-clockwise, for either direction of propagation of the wave. Thus, in the exemplified showing, after the transmitted wave energy returns from the target, an additional 45° phase shift is introduced when the wave passes back through the ferrite waveguide section 11 and the returned wave becomes orthogonally polarized with respect to the original plane-of-polarization of the wave energy from transmitter 14. Whereas the reentrant wave, due to its new polarization, cannot enter the transmitter connected rectangular waveguide it will instead be directed via the vertically disposed rectangular waveguide to the receiver 15 and thus a highly efficient utilization of a single antenna in a radar system is provided.

Figure 2 is a cut-away view in perspective of the novel structure of this invention in one embodiment thereof. As depicted in the drawing, the device of this invention comprises a ferrite rod 21, of determined composition and size, centrically extended within an especially configured waveguide section 22. In the drawing a circumjacent coil winding 23 is shown which encompasses the waveguide section to thus provide an axial magnetic field for the device.

It will be seen from Figure 2, that a novel type of waveguide is employed in this invention. Specifically, the invention utilizes an equi-dimensioned waveguide section having quadraturally disposed and longitudinally extended internal ridges (indicated at 24). In ampliation, the ridged waveguide described in this invention is in a sense similar to and at the same time distinct from, the normal ridged waveguide which conventionally will have one or two, but no more than two, internal ridges. It is common practice to substitute the conventional type of ridged waveguide for normal, or plain, waveguide where broadbandedness is desired. That is, it is known that a conventional ridged waveguide will support a wider band of frequencies (in their dominant mode) than a normal waveguide. In the ferrite rotator of the present invention the problem is not one of expanding the band of frequencies which the waveguide structure will support in their dominant mode, but rather of providing a constant rotation over the band of frequencies which the waveguide is now capable of supporting. It has been found that by quadraturally disposing the internal ridges, various polarizations of a propagated wave are equally effected and, that by the novel incorporation of a waveguide structure having equi-spaced internal ridges in the ferrite type rotator the desired constant rotation over the full band of frequencies which the normal waveguide is capable of supporting is provided.

Figure 3 pictorially shows a second embodiment of the ferrite rotator of this invention. In this example, a circular waveguide 25 having quadraturally disposed ridges is depicted and the ridges are inwardly extended to meet and support the centrically extended ferrite rod 21. In addition, as indicated at 26, the ridges have been tapered at their ends to provide a more proper matching impedance for the waveguide section. For many applications of the invention, in view of its simplicity, the particular means for supporting the ferrite rod shown in this embodiment is to be preferred over other means for supporting the rod, for example, over a low loss dielectric spacer as shown in Figure 2.

Figure 4, in a cross-sectional view for purposes of clarity, shows another embodiment of the invention. In this cross-sectional view only the top and bottom ridges of the four equi-spaced and quadraturally disposed ridges are visible. Again, as in the embodiment of Figure 3, the ridges indicated at 27, are inwardly extended to meet and support the ferrite rod 21 and are tapered at the ends to provide a proper matching impedance for the waveguide. In this embodiment, however, in place of the external magnetizing means shown in Figures 2 and 3, permanent magnets, indicated at 28, are embedded in the ridges, which are composed of a non-magnetic material such as brass. Where compactness is desired, it will be seen that the embodiment of Figure 4 is to be preferred over other embodiments described herein.

Figure 5 in another cross-sectional view, shows an alternative embodiment of the invention which incorporates an electromagnetic means for providing the required magnetic field in the ferrite rotator. As in Figures 3 and 4, the ridges are extended to meet and support the ferrite rod 21 and are tapered at the ends to provide the proper matching impedance. In this embodiment, the electromagnetic means comprises a U-shaped magnetic material and a magnetizing coil which encompasses the bend of the U-shaped material. As shown in the drawing the ends of the ferromagnetic material indicated at 29 and a non-magnetic material, for example brass, between the ends, constitute the ridges in this embodiment. Since the magnetic ferrite rod 21 is adjacent the non-magnetic brass indicated at 30, between the ends of the electromagnet, it will be seen that the flux of the electromagnet will take the path of least resistance and will be directed through the ferrite rod. As mentioned previously the permeability of the ferrite rod 21 is dependent upon the magnetic field imposed thereon. Thus where degree of rotation flexibility is desired, it will be seen that the embodiment of Figure 5 is to be preferred over the embodiment of Figure 4 wherein the strength of the magnetic field is non variable.

Figure 6 is a graphical presentation of the rotation of the plane-of-polarization of a propagated wave which is provided by the device of this invention for various frequency inputs as compared with the rotation provided by the conventional ferrite rotator for the same inputs. Specifically, curve A shows the rotation provided by a section of .9375 inch circular waveguide having quadraturally disposed and equi-spaced internal ridges and containing a .250 inch diameter ferrite core centrically supported by the internal ridges. Curve B shows the phase shift provided by a section of circular waveguide having no internal ridges but of the same diameter and containing a similar ferrite core. Whereas the degree of rotation provided by the conventional ferrite rotator varies with the frequency of the input wave (curve B) it will be seen that the degree of rotation provided by the device of this invention (curve A) is relatively constant over the range of frequencies which the waveguide will support.

Of general interest, it is frequently necessary, in high power application particularly, to provide a means for cooling the ferrite and it is an accepted practice to ventilate the ferrite by passing air through a hole in the center of the rod. For this reason the ferrite rod used in both the improved and the unimproved rotators compared above was provided with a .125 inch hole through its center.

Not only does the device of this invention provide the constant rotation illustrated in Figure 6 and the compactness and simplicity of the construction especially illustrated in Figures 3, 4 and 5, but by the close proximity of the ridges to the ferrite core, the device has the further advantage of conveniently dissipating heat produced by the ferrite core. Clearly the device of this invention is vastly superior to heretofore known ferrite type plane-of-polarization rotators.

While the device of this invention has been generally described as a means for rotating the plane-of-polarization of a propagated wave it is recognized that this device has substantial utility in a variety of waveguide applications, for example as a convenient electromagnetic means for varying the phase of the output wave energy.

It is understood that this invention is not to be limited to the particular embodiments exemplarily shown and described herein but that the invention is to be limited only by the scope of the claims appended hereto.

What is claimed is:

1. A plane-of-polarization rotator comprising a waveguide section having a plurality of quadraturally disposed internal ridges and capable of supporting orthogonal modes of a propagated wave, a ferromagnetic spinel rod centrically disposed within the ridged region of said waveguide and a magnetic field generating means disposed in close proximity to said waveguide section to provide an axial magnetic field which intersects said spinel rod in said ridged region such that the plane of polarization of wave energy propagated through said waveguide section is rotated.

2. A microwave device for rotating the plane-of-polarization of a propagated wave comprising a hollow pipe waveguide section capable of supporting orthogonal modes of a propagated wave, the walls of said waveguide having a plurality of longitudinal ridges internally protruding therefrom, a ferromagnetic spinel rod centrically disposed within the ridged region of said waveguide section and a magnetic field generating means disposed in close proximity to said waveguide section to provide an axial magnetic field which intersects said spinel rod in said ridged region such that the plane of polarization of wave energy propagated through said waveguide section is rotated.

3. A microwave device for rotating the plane-of-polarization of a propagated wave comprising a hollow pipe waveguide section capable of supporting orthogonal modes of a propagated wave, a ferromagnetic spinel rod centrically extended within said waveguide section, the walls of said waveguide having a plurality of longitudinal ridges internally extended therefrom to support said rod and a magnetic field generating means disposed in close proximity to said waveguide section to provide an axial magnetic field therefor.

4. A microwave device for rotating the plane-of-polarization of a propagated wave comprising a hollow pipe waveguide section capable of supporting orthogonal modes of a propagated wave, a ferromagnetic spinel rod centrically extended within said waveguide section, the walls of said waveguide having a plurality of longitudinal ridges internally extended therefrom to support said rod and a magnetic field generating means disposed within the ridged region of said waveguide section to provide an axial magnetic field therefor.

5. A microwave device for rotating the plane-of-polarization of a propagated wave comprising a hollow pipe waveguide section capable of supporting orthogonal modes of a propagated wave, a ferromagnetic spinel rod centrically extended within said waveguide section, the walls of said waveguide having a plurality of longitudinal ridges internally extended therefrom to support said rod, said ridges comprising the ends of a U-shaped magnetic material and a non-magnetic material therebetween, and an energizable coil encompassing the bend of said U-shaped magnetic material to produce an axial electromagnetic field within said waveguide section.

6. A microwave device for rotating the plane-of-polarization of a propagated wave comprising a hollow pipe waveguide section capable of supporting orthogonal modes of a propagated wave, the walls of said waveguide having four quadraturally disposed longitudinal ridges internally protruding therefrom, a ferrite rod centrically extended within the ridged region of said waveguide section and a magnetic field generating means disposed in close proximity to said waveguide section to provide an axial magnetic field which intersects said spinel rod in said ridged region such that the plane of polarization of wave energy propagated through said waveguide section is rotated.

7. A microwave device for rotating the plane-of-polarization of a propagated wave comprising a hollow pipe waveguide section capable of supporting orthogonal modes of a propagated wave, a ferromagnetic spinel rod centrically extended within said waveguide section, the walls of said waveguide having four quadraturally disposed longitudinal ridges internally protruding therefrom to support said rod and a magnetic field generating means disposed within the ridged region of said waveguide section to provide an axial magnetic field therefor.

8. A microwave device for rotating the plane-of-polarization of a propagated wave comprising a hollow pipe waveguide section capable of supporting orthogonal modes of a propagated wave, a ferromagnetic spinel rod centrically extended within said waveguide section, the walls of said waveguide having four quadraturally disposed longitudinal ridges internally protruding therefrom to support said rod, said ridges comprising the ends of a U-shaped magnetic material and a non-magnetic material therebetween, and an energizable coil encompassing the bend of said U-shaped magnetic material to produce an axial electromagnetic field within said waveguide section.

References Cited in the file of this patent

UNITED STATES PATENTS

| | | |
|---|---|---|
| 2,317,503 | Usselman | Apr. 27, 1943 |
| 2,422,058 | Whinnery | June 10, 1947 |
| 2,546,840 | Tyrrell | Mar. 27, 1951 |
| 2,611,094 | Rex | Sept. 16, 1952 |
| 2,644,930 | Luhrs | July 7, 1953 |
| 2,719,274 | Luhrs | Sept. 27, 1955 |